US008137023B2

(12) United States Patent
Greer

(10) Patent No.: US 8,137,023 B2
(45) Date of Patent: Mar. 20, 2012

(54) COUPLING ASSEMBLY FOR MOLTEN METAL PUMP

(76) Inventor: Karl E. Greer, Lewisport, KY (US)

( * ) Notice: Subject to any disclaimer, the term of this patent is extended or adjusted under 35 U.S.C. 154(b) by 979 days.

(21) Appl. No.: 12/070,005

(22) Filed: Feb. 14, 2008

(65) Prior Publication Data

US 2008/0194346 A1    Aug. 14, 2008

Related U.S. Application Data

(60) Provisional application No. 60/901,369, filed on Feb. 14, 2007.

(51) Int. Cl.
*B65G 21/20* (2006.01)
(52) U.S. Cl. ...... 403/306; 403/324; 415/200; 416/244 R
(58) Field of Classification Search ............... 403/109.6, 403/116, 150, 151, 153, 154, 161, 292, 294, 403/305, 306, 324, 361; 415/200, 216.14; 416/204 R, 244 R; 464/102, 104, 112, 120, 464/162, 182
See application file for complete search history.

(56) References Cited

U.S. PATENT DOCUMENTS

| | | | | |
|---|---|---|---|---|
| 2,997,864 A | * | 8/1961 | Rueb | 464/112 |
| 5,498,097 A | * | 3/1996 | Shapess | 403/322.1 |
| 5,622,481 A | * | 4/1997 | Thut | 417/319 |
| 5,685,701 A | * | 11/1997 | Chandler et al. | 417/424.1 |
| 5,873,672 A | * | 2/1999 | Goto | 403/268 |
| 6,511,211 B1 | * | 1/2003 | Karambelas | 362/311.01 |
| 6,709,234 B2 | * | 3/2004 | Gilbert et al. | 415/200 |
| 6,997,634 B2 | * | 2/2006 | Zheng | 403/188 |
| 7,470,392 B2 | * | 12/2008 | Cooper | 266/239 |
| 7,722,286 B2 | * | 5/2010 | Heald | 404/9 |
| 7,731,891 B2 | * | 6/2010 | Cooper | 266/239 |

* cited by examiner

*Primary Examiner* — Daniel Stodola
*Assistant Examiner* — Nahid Amiri
(74) *Attorney, Agent, or Firm* — Gary K. Price

(57) ABSTRACT

A coupling assembly for connection between a drive shaft and an impeller in a molten metal pump. The coupling assembly includes an upper portion to receive an end of the motor drive shaft and a lower portion to receive an end of the impeller shaft. The impeller shaft is pinned to the lower portion with a pin member which extends through first and second apertures in the lower portion of the coupling body. The pin member includes a handle portion, a driver member, and a stop. The driver member has an elongated configuration sized and shaped to pass through the first aperture of the coupling member. In application, once the impeller shaft is positioned in the coupling body, the pin member is passed through the apertures such that the driver member passes through the second aperture until the stop is in abutting relationship with the coupling member outer surface. Once the pin member and therefore driver member is inserted, the driver member is a contact point between the interior of the coupling member and impeller shaft.

10 Claims, 5 Drawing Sheets

COUPLING ASSEMBLY FOR MOLTEN METAL PUMP

CROSS REFERENCES TO RELATED APPLICATIONS

U.S. Provisional Application for Patent No. 60/901,369, filed Feb. 14, 2007, with title "Coupling Assembly for Molten Metal Pump" which is hereby incorporated by reference. Applicant claims priority pursuant to 35 U.S.C. par. 119(e)(i).

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

This invention relates to pumping molten metal and more particular to an improved coupling assembly connection between a drive and an impeller in a molten metal pump.

2. Brief Description of Prior Art

A molten metal pump apparatus generally includes a motor mounted above a molten metal bath. The motor drives a rotatable impeller pump having one or more impellers submerged in the bath. In operation, the rotating impellers draw molten material from the bath and pump it through a conduit routed to a subsequent station for further processing. The impellers are coupled to one end of a vertically oriented impeller shaft. An opposite end of the impeller shaft extending above the molten metal bath is affixed to a female coupling member. In many pump apparatuses, the end portion of the impeller shaft is threaded. To secure the impeller shaft to the coupling member, the impeller shaft is screwed into a correspondingly internally threaded portion of the female coupling member. An end of the drive shaft extending from the motor is received in the coupling member and pinned thereto providing a mechanical linkage between the rotating motor drive shaft and the pump impellers.

Some prior art couplings transmit torsional forces between the shaft end and coupling by providing a "modified square" coupling arrangement formed in the socket. This "modified square" is sized to receive a complimentary shaft end configuration such that the two shapes are closely fitted together. This "modified square" configuration has been found unsatisfactory since the internal corner portions of the coupling can be placed in shear and can cause fracture and premature wear. In addition, the prior art configurations are difficult and time consuming to clean.

Desirably, a coupling assembly would be available that would enable the impeller to be easily connected and would have superior strength characteristics. In addition, advantageous features would include a drive motor-impeller shaft connection that would permit the shaft to connect and disconnect easily from the drive motor without requiring excessive handling or machining of the shaft. In addition, it would be desirable to have a drive motor-impeller shaft connection that would be stronger than conventional shaft connections or the prior art "modified square" design. It would also be advantageous to have a coupling that can easily be cleaned in a very short period of time. The coupling assembly of the present invention satisfies these advantages.

SUMMARY OF THE INVENTION

A coupling assembly for connection between a drive shaft and an impeller in a molten metal pump. The coupling assembly includes a coupling body dimensioned to receive an end of the motor drive shaft in an upper portion of the coupling body and receive an end of the impeller shaft in a lower portion. An interior stepped portion provides a stop for the end of the impeller shaft.

The impeller shaft is pinned to the lower portion with a pin member which extends through first and second apertures in the lower portion of the coupling body. The pin member secures the impeller shaft to the coupling member. A retainer secures the impeller shaft to the coupling member.

Accurate axial positioning of the coupling member on the impeller shaft is permitted prior to inserting the pin member. Thus, the pin member when filled through the apertures will stop the coupler member at a precise axial position on the impeller shaft when the coupling is being mounted to the shaft. The result is a precise positioning of the coupling and results in precise axial positioning of the connector shaft and elements mounted thereto.

The pin member further includes a handle portion, a driver member, and a stop. The driver member having an elongated configuration sized and shaped to pass through the first aperture of the coupling member. In application, once the impeller shaft is positioned in the coupling body, the pin member is passed through the apertures such that the driver member passes through the second aperture until the stop is in abutting relationship with the coupling member outer surface. Once the pin member and therefore driver member is inserted, the driver member is a contact point between the interior of the coupling member and impeller shaft.

DESCRIPTION OF THE PREFERRED EMBODIMENT

Figure 1:
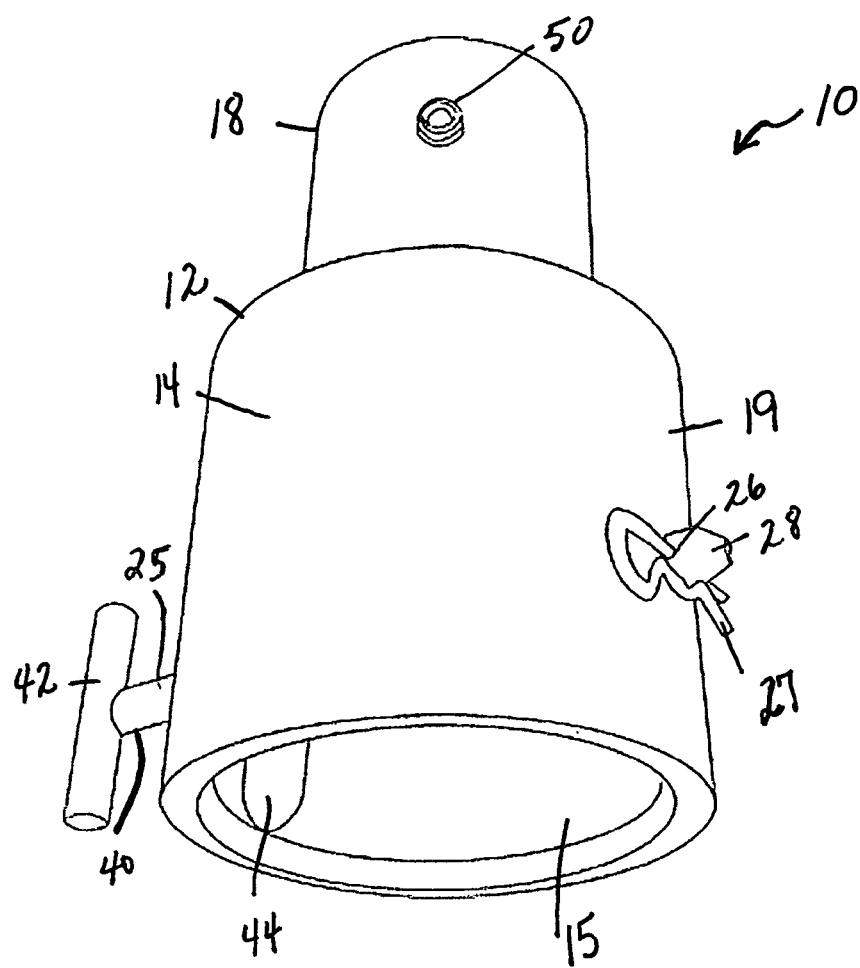
FIG. 1 is a perspective view of a preferred embodiment of the present invention, a coupling assembly connection between a drive and an impeller in a molten metal pump.

In accordance with the present invention, a coupling assembly for connection in a molten metal pump is disclosed. The coupling assembly is directed to a coupling connection between a drive shaft and an impeller in the molten metal pump. Specifically, it will be noted in the drawings that the coupling assembly of the present invention provides a coupling design that is less likely to cause harm to the more fragile shaft and impeller during installation, has superior strength characteristics, and can easily be cleaned in a very short period of time. In the broadest context, the coupling assembly for molten metal pump consists of components configured and correlated with respect to each other so as to attain the desired objective.

FIGS. 1-5 illustrate a preferred embodiment of a coupling assembly 10 for a molten metal pump made in accordance with the present invention. The coupling assembly 10 for connection between a drive shaft and an impeller in a molten metal pump. More particularly, the coupling assembly 10 generally is a female coupling member having two co-axial shaft receiving openings adapted to receive an end of the motor-driven drive shaft 200 and an end of the impeller shaft 100. The structural components of the molten metal pump are of a conventional form and are not therefore discussed in detail or shown, as such components are well known to those of ordinary skill in the art of molten metal pump design.

An impeller shaft 100 assembly known in the art is provided for a molten metal pump having an impeller and driver with a drive shaft generally rotatable about a drive axis. The impeller shaft 100 assembly includes the coupling assembly 10 of the present invention to be secured to the pump drive shaft such that rotation of the coupling assembly 10 will result in engagement of the drive shaft engaging surfaces with a removable driver member 44 abutting the peripheral side surfaces 15 of the coupling 10.

More particularly, the coupling assembly 10 includes a coupling body 12 that defines a stepped interior to accommodate shafts which are of different diameters. The coupling's stepped interior is dimensioned to receive an end of the motor drive shaft in an upper portion 18 of the coupling body 12 and similarly receive an end of the impeller shaft in a lower portion 19 of the coupling body. An interior stepped portion 20 provides a stop for the end of the impeller shaft.

As will be further described, the impeller shaft is pinned to the lower portion 19 with a pin member 25 which extends through first and second apertures 30, 35 respectively in the lower portion 19 of the coupling body 12. More particularly, the pin member 25 secures the impeller shaft to the coupling member 12. The pin member 25 extends through the aligned apertures 30, 35 in the coupling member's lower portion 19 and through a crossbore (not shown) of the impeller shaft. A retainer 27 secures the impeller shaft to the coupling member 12. After the impeller shaft is inserted into the coupling member and properly rotated to align the crossbore with the coupling member apertures 30, 35, the pin member 25 is inserted as described. The pin member 25 is dimensioned such that it fits snugly but slidingly in the passageway defined by the crossbore and the second aperture 35 having the substantially same diameter, and is of a length such that it extends through the coupling member outer surface 14. After inserting the pin member 25 the retainer 27 is inserted in a groove 26 disposed at a tapered end 28 of the shaft member 25. The pin member 25 includes a cylindrical section 24 where the cylindrical section has a length that is longer than a diameter of the shaft 100 such that the cylindrical section 24 can pass through the diameter of the shaft.

Accurate axial positioning of the coupling member 12 on the impeller shaft is permitted prior to inserting the pin member 25 as previously described. Thus, the pin member 25 when filled through the apertures 30, 35, will stop the coupler member 12 at a precise axial position on the impeller shaft when the coupling is being mounted to the shaft. The result is a precise positioning of the coupling and results in precise axial positioning of the connector shaft and elements mounted thereto.

Prior to inserting the pin member 25, the exemplary interior sides 15 of the coupling member 12 is a rounded, non-obtrusive surface. As such, ample clearance or space between the coupling body interior 15 and adjacent shaft surfaces is achieved in order to more easily position the coupling on the shaft. Such rounded surface is further advantageous when cleaning the interior 15 of the coupling member 12.

Figure 2:
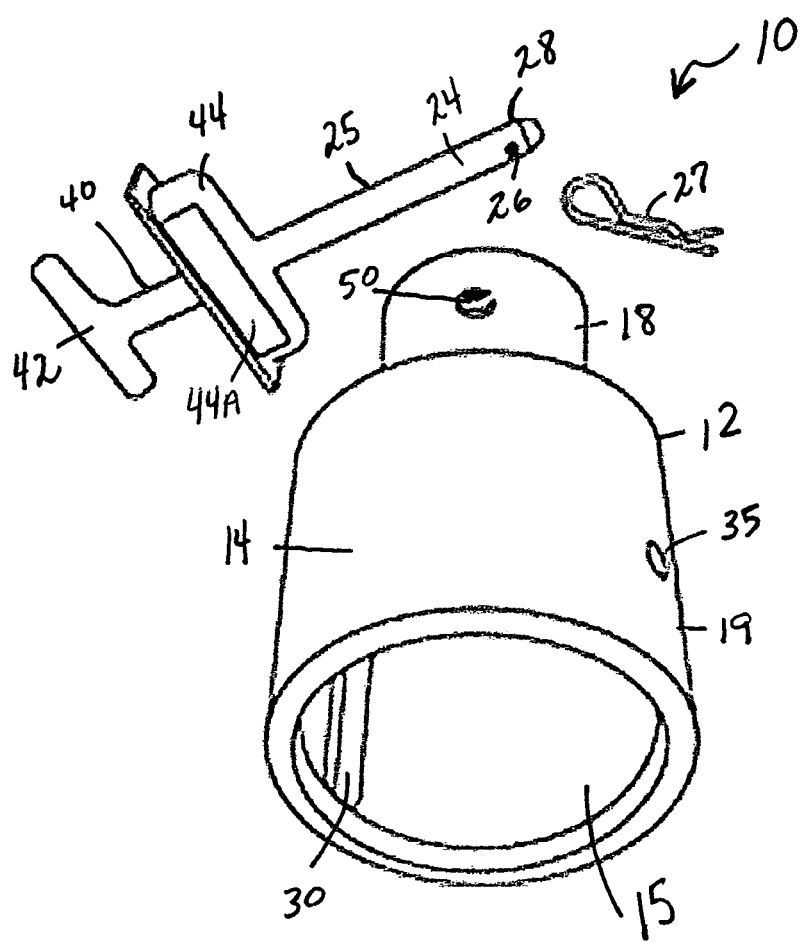
FIG. 2 is an exploded view of the coupling assembly illustrated in FIG. 1.

As best shown in FIG. 2, the pin member 25 further includes an end 40 opposite the tapered end 28. The end 40 defines a handle portion 42, the driver member 44, and a stop 46 adjacent the driver member 44 and disposed between the handle portion 42 and driver member 44. The driver member 44 having an elongated configuration is sized and shaped to pass through the aperture 30 of the coupling member outer surface 14. In application, once the impeller shaft is positioned in the coupling body 12 as previously discussed, the pin member 25 is passed through the apertures 30, 35 such that the driver member 44 passes through the first aperture 30 until the stop 46 is in abutting relationship with the coupling member outer surface 14. As should be understood, the stop 46 is dimensioned larger than the first aperture 30 such that once the stop 46 is in communication with the outer surface 14, the retainer pin 27 can be inserted through the groove 26 of the pin member 25 in order to secure the coupling member 12 and impeller shaft in an axial locked position.

Once the pin member 25 and therefore driver member 44 is inserted as described, the driver member 44 provides a contact surface between the interior 15 of the coupling member 12 and impeller shaft.

The upper portion 18 of the coupling member 12 is mounted and positioned on the drive shaft using means 50 known in the art.

Among the advantages of using a removable driver member 44 is that the driver member 44 is designed stronger and less likely to break in the coupling area. The member 44 has a much greater cross-sectional area resisting shear and a greater surface area resisting crushing than would the cylindrical portion 24 alone. Further, since the driver member 44 is removable, when a shaft is being installed in the pump and the pump is being lowered over the shaft and impeller, it is less likely to cause harm to the fragile graphite shaft. Also, since the driver member 44 is removable, the coupling member 12 can be more easily cleaned since the interior surface 15 of the coupling body 12 is relatively round, and without the driver member 44 installed, without any obstructions to obstruct cleaning.

Figure 5:
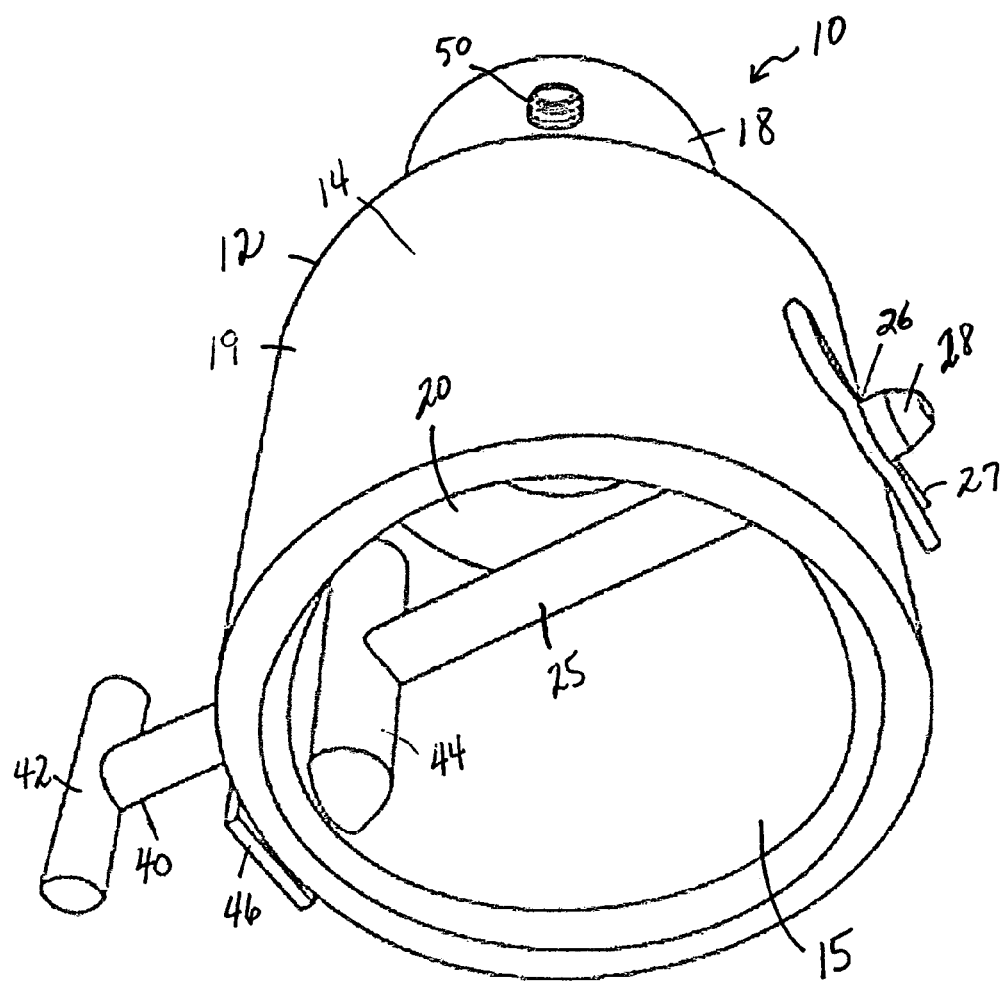
FIG. 5 is a bottom view of the coupling assembly of FIG. 1

As can be seen in FIGS. 2 and 5, if only the cylindrical portion 24 were used to couple the shaft 100 to the coupling 10, the diameter 25 would provide a much smaller area to resist crushing and shear that normally results from torque transmission. Whereas, the driver member 44 provides an elongated engagement flat surface 44A shown in FIG. 2 that creates a substantial shear and crush resisting the coupling engagement. The surface 44A should match a section of wall 30A, in this case both have elongated axial flat surfaces that match up to transmit torque.

Figure 3:
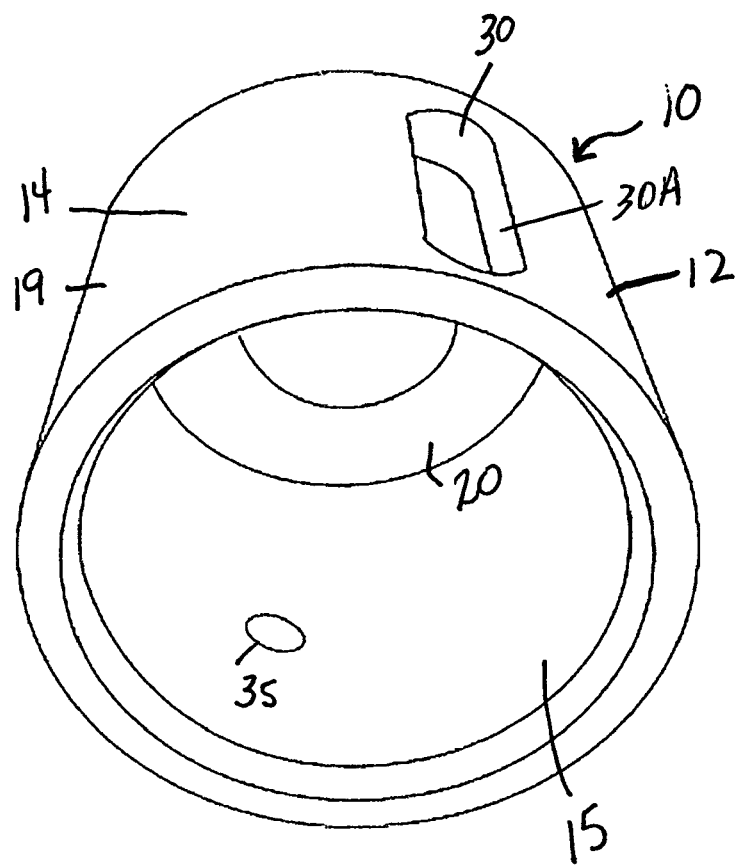
FIG. 3 is a bottom view of the coupling member.
Figure 4:
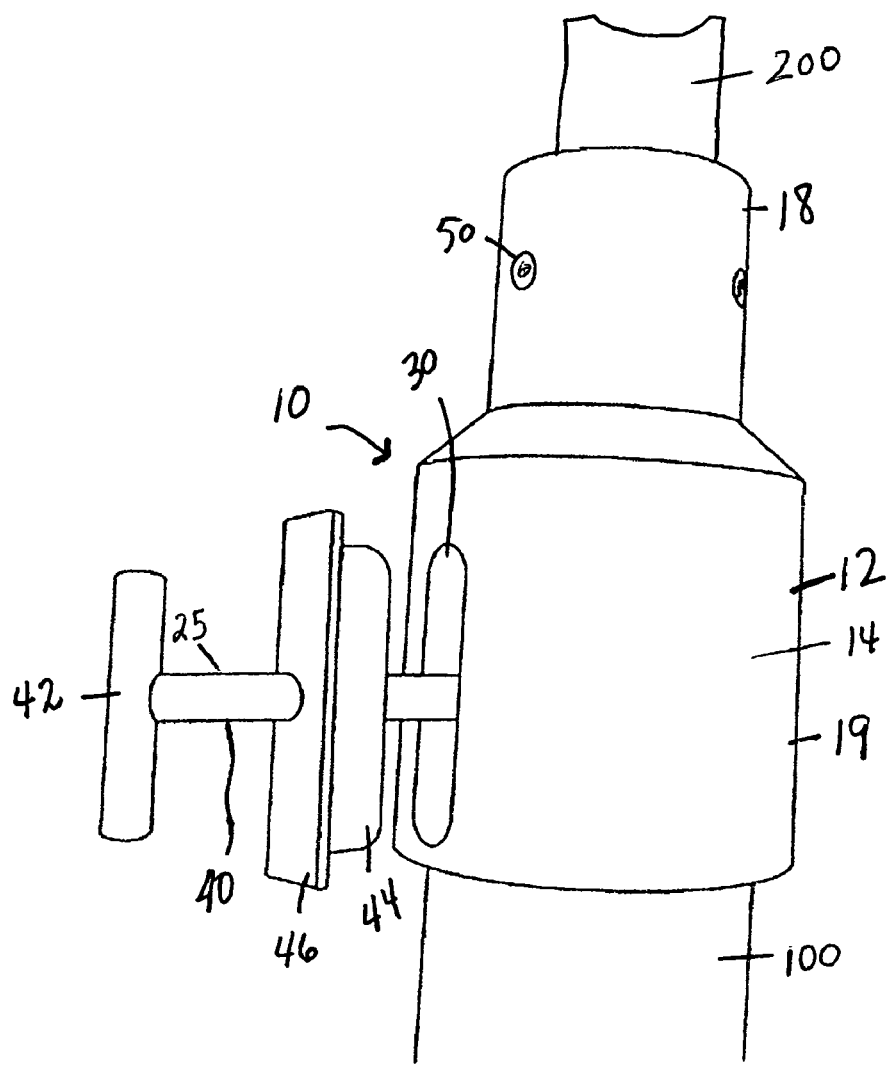
FIG. 4 illustrates application of the driver member and coupling member.

FIG. 3 shows the coupling 10 from an end view. The aperture 30 includes the wall 30A that engages the driver member 44 to transmit torque. The wall 30A provides a much greater surface area than is possible with the circular aperture 35 such that the torque transmitting coupling 30A, 44A has a much greater surface area to resist crushing during torque transmission and the driver 44 has a much greater cross-sectional area than the cylindrical portion 24 to avoid shear in torque transmission. The driver 44 is elongated in the co-axial direction of the shafts 100 and 200 and of the coupling 10.

Although the description above contains many specificities, these should not be construed as limiting the scope of the invention but as merely providing illustrations of some of the presently preferred embodiments of this invention. Thus the scope of the invention should be determined by the appended claims in the formal application and their legal equivalents, rather than by the examples given.

I claim:

1. A coupling assembly for connection between a drive shaft and an impeller in a molten metal pump, said coupling assembly comprising:
a coupling body defining an upper portion dimensioned to for receiving an end of a motor drive shaft, and a lower portion dimensioned for receiving an end of an impeller shaft, an interior stepped portion providing a first stop for the end of the impeller shaft, said lower portion having first and second aligned apertures receiving a pin member to secure the impeller shaft to the coupling body, wherein said first aperture is an axially elongated slot, said pin member includes a handle portion, a driver member, a second stop, and a cylindrical portion having a length that is longer than a diameter of the coupling body, and wherein said second stop is adjacent said driver member and is dimensioned larger than said first aperture, said driver member having an elongated configuration sized and shaped to pass through the first aperture of the coupling body and includes a flat surface that engages said wall surface to transmit torque, and wherein said driver member has a greater cross-sectional area than said cylindrical portion of said pin member.

2. The coupling assembly as recited in claim 1, wherein said drive member is elongated in an axial direction of said drive shaft.

3. The coupling assembly as recited in claim 2, wherein said torque transmitting surface is a flat section that engages said interior wall to form a torque transmitting coupling having an axially elongated contact surface.

4. The coupling assembly as recited in claim 3, wherein said pin includes a cylindrical section passing through said impeller shaft perpendicular to said elongated surface.

5. The coupling assembly as recited in claim 3, wherein said pin member includes a retainer that cooperates with said second stop to maintain said pin member in said first and second apertures.

6. A torque transmitting coupling assembly for connection between a first and second shafts, said coupling assembly comprising:

a coupling body defining an upper portion dimensioned for receiving an end of a first shaft, and a lower portion dimensioned for receiving an end of a second shaft, an interior stepped portion providing a first stop for the end of the second shaft, said lower portion having first and second aligned apertures receiving a pin member to secure the second shaft to the coupling body, said pin member includes a handle portion, a drive member, a second stop, and an elongated cylindrical portion, wherein said first aperture is an axially elongated slot and said second aperture on an opposite side of said coupling body is a circular hole and wherein said cylindrical portion fits said circular hole and wherein said second stop is disposed between said handle portion and said driver member and is dimensioned larger than said first aperture, and said driver member is axially elongated to fit in said elongated slot and has an elongated torque transmitting surface that mates with an interior wall of said elongated slot, and wherein said driver member has a greater cross-sectional area than said cylindrical portion.

7. The coupling assembly as recited in claim 6, wherein said elongated torque transmitting surface is a flat surface that engages said interior wall of said first aperture to form a torque transmitting coupling having an axially elongated contact surface.

8. The coupling assembly as recited in claim 6, wherein said driver member is elongated in an axial direction of said drive shaft.

9. The coupling assembly as recited in claim 6, wherein said pin includes a cylindrical section passing through said second shaft perpendicular to said elongated slot.

10. The coupling assembly as recited in claim 6, wherein said first shaft is a motor shaft and said second shaft is a graphite impeller shaft.

\* \* \* \* \*